(12) United States Patent
Young

(10) Patent No.: US 10,259,375 B2
(45) Date of Patent: Apr. 16, 2019

(54) CARGO RESTRAINING APPARATUS

(71) Applicant: Norman D. Young, Springville, UT (US)

(72) Inventor: Norman D. Young, Springville, UT (US)

(*) Notice: Subject to any disclaimer, the term of this patent is extended or adjusted under 35 U.S.C. 154(b) by 0 days.

(21) Appl. No.: 15/936,220

(22) Filed: Mar. 26, 2018

(65) Prior Publication Data
US 2018/0272915 A1   Sep. 27, 2018

Related U.S. Application Data

(60) Provisional application No. 62/476,098, filed on Mar. 24, 2017.

(51) Int. Cl.
*B60P 7/08* (2006.01)

(52) U.S. Cl.
CPC .................... *B60P 7/0823* (2013.01)

(58) Field of Classification Search
CPC .... B60P 7/0823; B61D 45/001; B61D 45/002
See application file for complete search history.

(56) References Cited

U.S. PATENT DOCUMENTS

| 2,353,017 A * | 7/1944 | Denton .................. B63B 25/28 24/71.1 |
| 2,372,967 A * | 4/1945 | Martin .................... B64D 9/00 224/42.4 |
| 2,455,237 A * | 11/1948 | Davis .................... B60P 7/0876 150/154 |
| 2,605,064 A * | 7/1952 | Davis ...................... B64D 9/00 105/345 |
| 2,696,360 A * | 12/1954 | Toffolon ................ B65D 19/44 108/55.5 |
| 3,084,966 A * | 4/1963 | Higgins .................. B66C 1/127 220/492 |
| 3,173,539 A * | 3/1965 | Looker .................. B65D 19/44 206/597 |
| 3,312,181 A * | 4/1967 | Davidson ............. B60P 7/0815 206/597 |
| 3,478,394 A * | 11/1969 | Davis .................... B60P 7/0823 24/323 |
| 3,906,871 A * | 9/1975 | Csumrik .................. B60P 7/15 410/116 |

(Continued)

FOREIGN PATENT DOCUMENTS

| CA | 1259167 A * | 9/1989 | ............ B60P 7/0823 |
| DE | 202016102046 U1 * | 6/2016 | ............ B60P 7/0823 |

(Continued)

*Primary Examiner* — Hilary L Gutman
(74) *Attorney, Agent, or Firm* — Morriss O'Bryant Compagni Cannon, PLLC

(57) ABSTRACT

A cargo restraining apparatus includes a T-shaped buckle assembly configured to couple to a T-shaped strap assembly. The T-shaped strap assembly is configured to extend around and over the cargo and be secured to the cargo with the T-shaped buckle assembly. A plurality of tie-down clips is coupled to the T-shaped strap assembly at various locations along the sections of straps extending around the cargo. Each tie-down clip is configured to be coupled to a corresponding tie-down strap that extends from the clip to an anchor point of the vehicle or trailer.

17 Claims, 7 Drawing Sheets

(56) References Cited

U.S. PATENT DOCUMENTS

| | | | | |
|---|---|---|---|---|
| 3,961,585 A * | 6/1976 | Brewer | B60P 7/0876 | 294/77 |
| 4,043,275 A * | 8/1977 | Rochester, Jr. | B60P 7/0823 | 24/116 R |
| 4,115,884 A * | 9/1978 | Keogh | A61G 3/00 | 296/19 |
| 4,257,644 A * | 3/1981 | Stephens | A61G 3/0808 | 296/65.04 |
| 4,436,466 A | 3/1984 | Marino | | |
| 5,050,924 A | 9/1991 | Hansen | | |
| 5,193,955 A * | 3/1993 | Chou | B60P 7/0823 | 24/193 |
| 5,388,702 A * | 2/1995 | Jones | B65D 19/44 | 150/154 |
| 5,393,025 A * | 2/1995 | Franklin | A47B 81/06 | 248/317 |
| 5,416,956 A * | 5/1995 | Rubin | B60P 7/0823 | 24/199 |
| 5,440,790 A * | 8/1995 | Chou | B60P 7/0823 | 24/302 |
| 5,458,447 A * | 10/1995 | Clason | B60P 7/0876 | 410/100 |
| 5,551,379 A * | 9/1996 | Hart | A01K 27/003 | 119/771 |
| 5,709,014 A * | 1/1998 | Takahashi | A44B 11/2511 | 24/614 |
| 5,784,761 A | 7/1998 | Allen | | |
| 6,152,664 A | 11/2000 | Dew et al. | | |
| 6,170,133 B1 * | 1/2001 | Uehara | A44B 11/2511 | 24/614 |
| 6,209,768 B1 * | 4/2001 | Boaz | B60R 9/04 | 224/314 |
| 6,637,077 B2 * | 10/2003 | Doty | B60P 3/079 | 24/298 |
| 6,767,169 B2 * | 7/2004 | Zhan | B60P 7/0823 | 410/100 |
| 6,851,902 B2 * | 2/2005 | Stanley | B61D 45/001 | 410/96 |
| 6,892,912 B1 * | 5/2005 | MacNeil | B60R 9/055 | 224/318 |
| 6,896,458 B1 * | 5/2005 | Romero | B60P 7/0823 | 410/100 |
| 8,287,216 B2 * | 10/2012 | Frett | B61D 45/001 | 410/100 |
| 8,444,101 B2 * | 5/2013 | Holman | B65D 25/22 | 24/68 CD |
| 8,544,803 B2 | 10/2013 | Ball | | |
| 8,974,158 B1 * | 3/2015 | Hatch | B60P 7/0876 | 410/117 |
| 9,527,424 B1 * | 12/2016 | Sarnowski | B60P 7/0823 | |
| 9,845,042 B1 * | 12/2017 | McCarter | B60P 7/0869 | |
| 9,849,822 B1 * | 12/2017 | Dankert | B60P 7/0876 | |
| 9,862,530 B2 * | 1/2018 | Sauey | B65D 63/16 | |
| 2003/0115726 A1 * | 6/2003 | Liao | B60P 7/0823 | 24/569 |
| 2007/0196193 A1 * | 8/2007 | Hill | B60P 3/079 | 410/23 |
| 2008/0104805 A1 * | 5/2008 | Cameron | B60P 7/0823 | 24/346 |
| 2010/0285939 A1 * | 11/2010 | Latronica | A63B 21/16 | 482/139 |
| 2016/0031359 A1 * | 2/2016 | Parrin | B60P 7/0807 | 410/98 |
| 2018/0029519 A1 * | 2/2018 | Hill | B60P 7/0823 | |

FOREIGN PATENT DOCUMENTS

| | | | | |
|---|---|---|---|---|
| FR | 2863562 A1 * | 6/2005 | | B60P 7/0823 |
| GB | 1498655 A * | 1/1978 | | B60P 7/0823 |

* cited by examiner

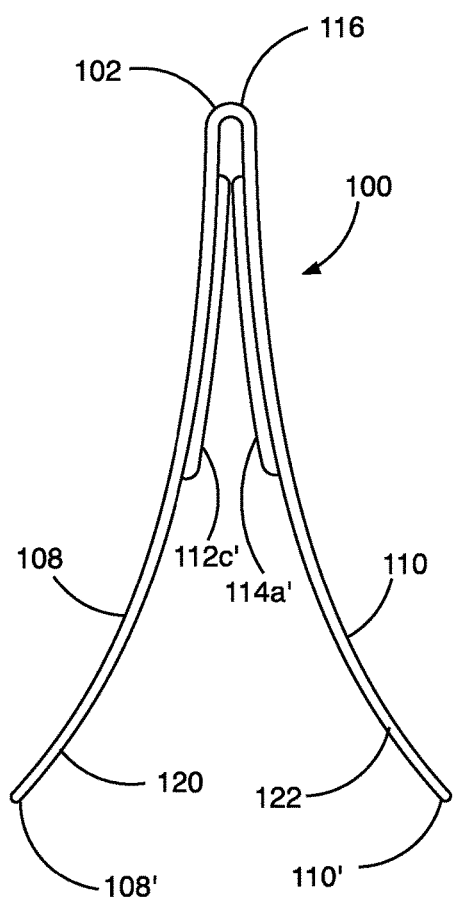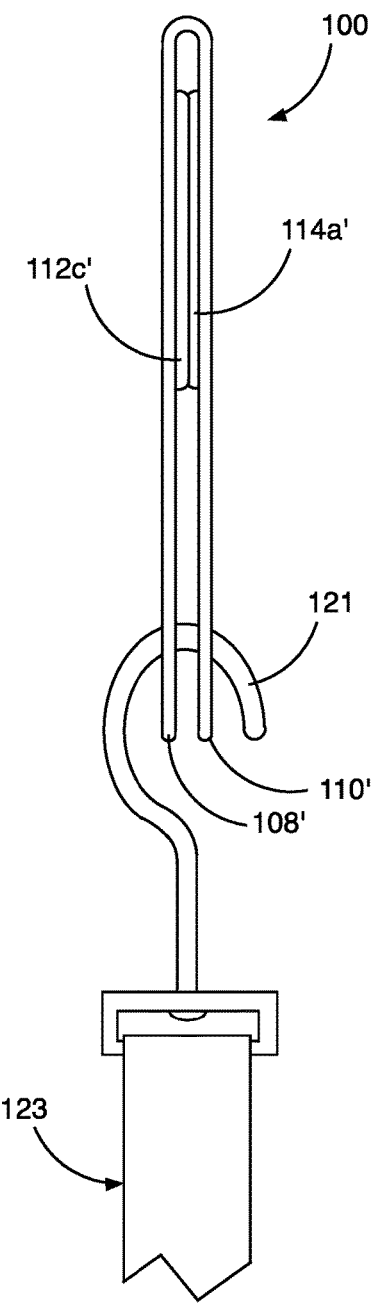
FIG. 6
FIG. 7

CARGO RESTRAINING APPARATUS

CROSS-REFERENCE TO RELATED APPLICATION

The present application claims priority to U.S. Provisional Patent Application Ser. No. 62/476,098 filed on Mar. 24, 2017, the entirety of which is incorporated by this reference.

BACKGROUND

Field of the Invention

The present invention relates generally to devices for restraining cargo in a vehicle during transportation. More particularly, it relates to a cargo restraining apparatus for securing cargo in the bed of a pick-up truck or utility trailer, in a boat, vehicle or other transport known in the art.

Description of the Related Art

Vehicles such as pick-up trucks and utility trailers that are pulled by such vehicles are often used to transport various types of cargo from one location to another. Transporting cargo in such a manner poses a number of hazards. For example, certain types of cargo can easily be toppled, ejected from the vehicle or trailer, or otherwise shifted during transportation, which can pose significant hazards to pedestrians and other motorists who are in the path of the ejected cargo. Shifting cargo can also upset the balance of the vehicle or trailer, which can lead to loss of control of the vehicle. Even when shifting cargo is contained within the vehicle's cargo area, the cargo itself may become damaged. It is therefore important to secure the cargo within the vehicle during transportation.

Various devices have been employed in the past in an effort to secure cargo within a vehicle, utility trailer or the like. Such attempts to provide cargo tie down assemblies have been available for decades, many of which include a plurality of straps. For example, U.S. Pat. No. 2,353,017 to Denton discloses a cargo deck lashing system that utilizes metal straps tensioned with yoke and bolt assemblies. U.S. Pat. No. 2,373,967 utilizes a plurality of ringed straps that are connected with fasteners. U.S. Pat. No. 2,605,064 discloses a cargo securing system comprised of a plurality of straps that are coupled to a plurality of tracks formed in the cargo carrier. U.S. Pat. No. 8,544,803 discloses an appliance strapping system that employs a plurality of straps to anchor an appliance to a wall.

Other attempts in the art include systems comprised of interconnected straps to form a net or blanket that can extend over the cargo. For example, U.S. Pat. No. 2,455,237 to Davis discloses a cargo blanket that is coupled to a plurality of straps. Similarly, U.S. Pat. No. 2,696,360 to Toffolon discloses blanket and strap assembly for securing cargo to a pallet. U.S. Pat. No. 3,173,539 discloses a cargo securing arrangement comprised of a complex net of interconnected straps. Similarly, U.S. Pat. No. 3,312,181 to Davidson discloses a cargo-restraining device that includes a net of cargo straps that are coupled to the cargo vehicle by specially designed hold down devices. U.S. Pat. No. 3,478,394 discloses a similar cargo tied own system with a plurality of straps arranged in a net-like form over the cargo. Likewise, U.S. Pat. No. 3,961,585 to Brewer discloses a net of a plurality of intersecting straps forming a lattice structure to encompass a load to maintain the load on a support pallet. U.S. Pat. No. 4,436,466 to Marino discloses a cargo restraining apparatus that includes a rectangular panel and straps arranged on the panel. U.S. Pat. No. 5,050,924 discloses an expandable tarp with a plurality of straps extending over the tarp. U.S. Pat. No. 5,193,955 to Chou discloses a net of a plurality of straps with strap tensioners. U.S. Pat. No. 5,784,761 to Allen discloses a load retainer having a flexible body with tie down straps coupled to the load retainer. U.S. Pat. No. 6,152,664 to Dew et al. discloses a cargo restraining apparatus that includes a cargo net with anchor straps. U.S. Pat. No. 8,974,158 to Hatch et al. discloses a laced strapping system for securing loads to a vehicle bed that includes a plurality of tie-down straps that are laced together to form a net over the cargo.

Many of these devices, however, are complex, difficult to use, are not easily adaptable to large differences in load size and relatively expensive to manufacture.

Thus, it would be an advantage to provide a cargo-restraining device that is compact, easy to use, universal in nature and relatively inexpensive to manufacture.

SUMMARY OF THE INVENTION

The present invention provides cargo-restraining apparatus comprising a T-shaped, three buckle assembly configured to be coupled to a T-shaped strap assembly having three strap ends. The T-shaped strap assembly has a first strap end configured to extend around a cargo in one direction, a second strap end configured to extend around the cargo in the opposite direction to the first strap end and a third strap end configured to extend over the cargo. All three strap ends are positioned in proximity to on another on an opposite or far side of the cargo. The three free ends of the T-shaped strap assembly are coupled to the T-shaped, three buckle assembly and secured to the cargo. A plurality of tie-down clips are removably coupled to the first strap and the second strap sections that extend around the cargo and can be positioned at various locations along the first and second straps. Each of the tie-down clips are formed by a folded plate-like structure that is positioned over a strap and secured thereto. A plurality of tie-down straps each have a first end coupled to a respective one of the plurality of tie-down clips and a second end coupled to an anchor point of a structure upon which the cargo is resting.

The buckle assembly comprises a first strap assembly having first, second and third free ends and first, second and third strap buckles, each of the first, second and third strap buckles fixedly coupled to a respective one of the first, second and third free ends of the first strap assembly.

The second strap assembly comprises first and second elongate straps, the second elongate strap having a first end coupled to the first elongate strap, the second end of the second elongate strap and first and second free ends of the first elongate strap each configured for coupling to a respective one of the first, second or third strap buckles of the buckle assembly, and the first elongate strap having a first length to extend substantially horizontally around a cargo and the second strap configured to extend substantially vertically over a top of the cargo.

The cargo restraining apparatus further comprises a plurality of tie-down clips configured to be selectively positionable along the first strap.

A plurality of tie-down straps each has a first end coupled to the second strap assembly and a second end coupled to a structure upon which the cargo is resting.

As previously noted, the first strap assembly comprises a first T-shaped arrangement of straps to which the first, second and third buckles are coupled.

Likewise, the second strap assembly comprises a second T-shaped arrangement of straps that extend around the cargo.

The first strap assembly is comprised of first and second strap sections fixedly attached together with the second strap section attached proximate a midpoint of the first strap section in a T shape.

The first and second strap sections position the first and second strap buckles along a horizontal axis with the first and second strap buckles facing in opposite directions and the third strap buckle oriented at approximately 90 degrees to the first and second buckles to face in a direction perpendicular to the horizontal axis.

The first and second elongate straps are fixedly attached together with the second elongate strap fixedly attached proximate a midpoint of the first elongate strap in a T shape.

The first and second elongate straps are oriented relative to one another so that the first and second free ends of the first elongate strap are extendable along a horizontal axis, as when laid flat, with the first and second free ends facing in opposite directions and the second elongate strap is oriented at approximately 90 degrees to the first elongate strap so that second end of the second elongate strap faces in a direction perpendicular to the horizontal axis, as when laid flat.

Each of the plurality of tie-down clips comprise a plate, the plate defining a folded portion proximate a midsection of the plate, a first end of the plate opposite the midsection defining a first retaining hole that aligns with a second retaining hole defined in the second end of the plate opposite the first end when the first and second ends of the plate are brought together.

Each of the plurality of tie-down clips comprise a plurality of protrusions on an inside surface for engaging with the first elongate strap, the plurality of protrusions comprising a first set of protrusions positioned on one side of the folded portion and a second set of protrusions positioned on an opposite side of the folded portion, the first and second set of protrusions positioned to engage with one another when the first and second ends of the plate are brought together.

Each of the plurality of tie-down clips are comprised of a resilient material and the first and second ends of the plate are flared apart when in a resting position to allow the first elongate strap to be positioned within the plurality of tie-down clips and wherein the plurality of tie-down clips become non-slidably attached to the first elongate strap when the first and second ends of the plate are brought together.

These and other advantages of the present invention are shown and described with reference to the drawings.

BRIEF DESCRIPTION OF THE DRAWINGS

The following detailed description of the illustrated embodiments is better understood when read in conjunction with the appended drawings. For the purpose of illustrating the invention, there is shown in the drawings exemplary embodiments which illustrate what is currently considered to be the best mode for carrying out the invention, it being understood, however, that the invention is not limited to the specific methods and instruments disclosed. In the drawings:

FIG. 6 is a side view of the cargo strap clip of FIG. 5A.

FIG. 7 is a side view of the cargo strap clip of FIG. 6 attached to a tie-down strap.

DETAILED DESCRIPTION OF THE ILLUSTRATED EMBODIMENTS

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. Thus, the full scope of the invention is not limited to the examples that are described below.

Figure 1:
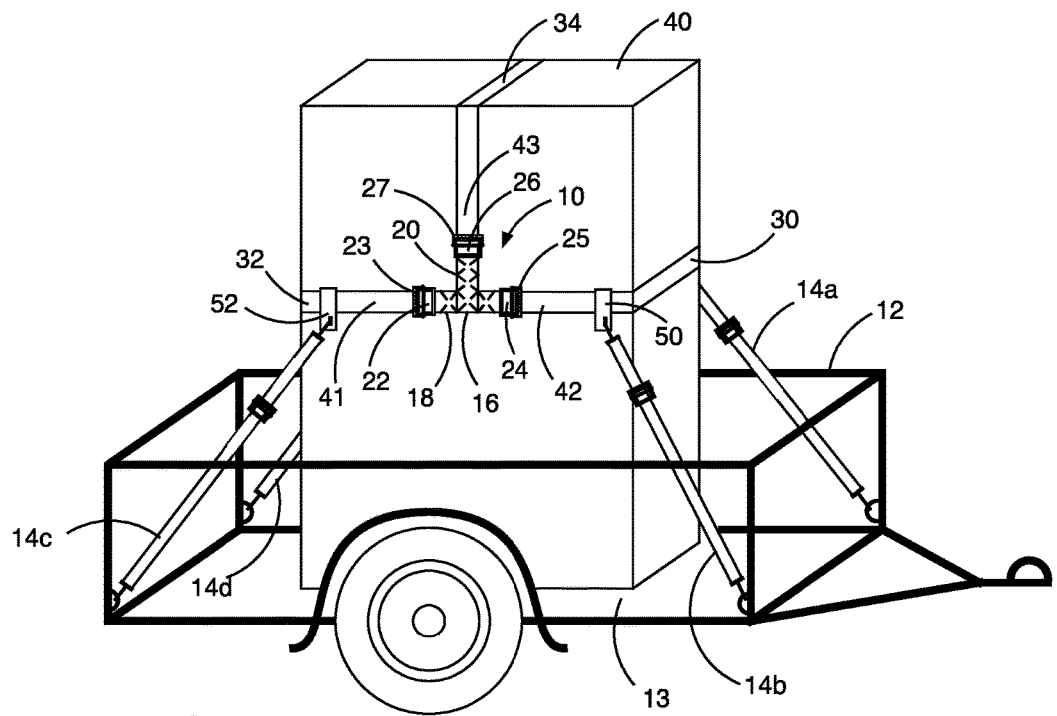
FIG. 1 is a perspective left side view of a utility trailer with cargo secured to the utility trailer by a cargo restraining apparatus in accordance with the principles of the present invention.
Figure 2:
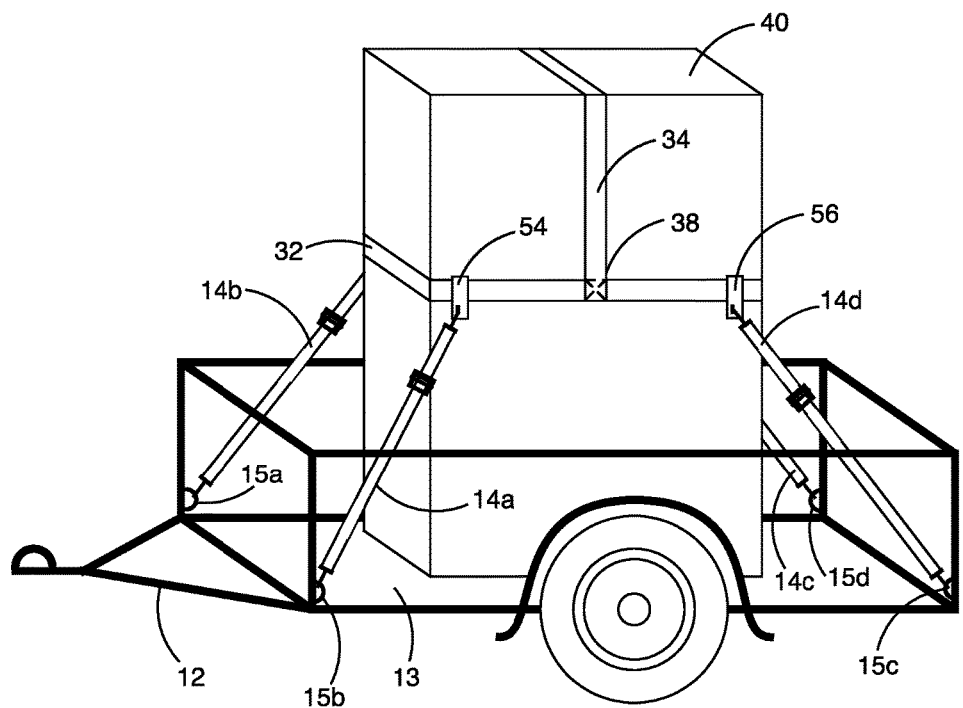
FIG. 2 is a perspective right side view of a utility trailer with cargo secured to the utility trailer by a cargo restraining apparatus in accordance with the principles of the present invention.

With reference now to the drawings in which like reference characters designate like or similar parts throughout the several views, FIGS. 1 and 2 show a cargo restraining apparatus 10 for securing cargo during transportation. In the embodiment shown in FIG. 1, the cargo restraining apparatus 10 is used to secure cargo 40 within the bed 13 of a utility trailer 12 by attaching the apparatus 10 with tie down straps 14a-14d each secured at one end to anchors at the corners of the bed 13 of the utility trailer 12 and secured at the other end to clips (such as clips 50 and 52) of the cargo restraining device 10. It will be understood, however, that the cargo restraining apparatus of the present invention could be used to restrain a variety of cargo types in a variety of vehicles and cargo transport types, including but not limited to tractor-trailers, trains, aircraft, and watercraft.

Figure 3:
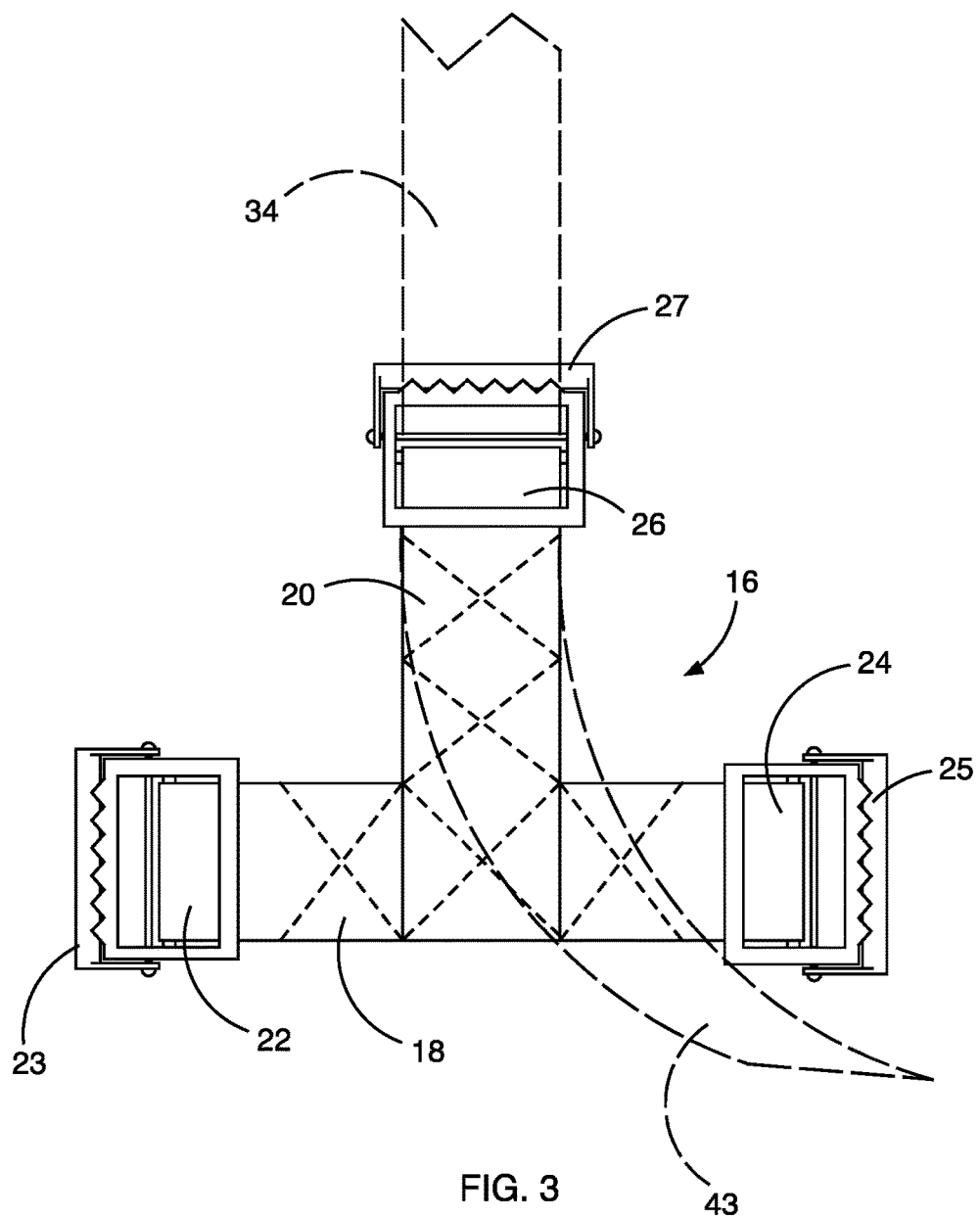
FIG. 3 is a top side view of a buckle assembly in accordance with the principles of the present invention.
Figure 4:
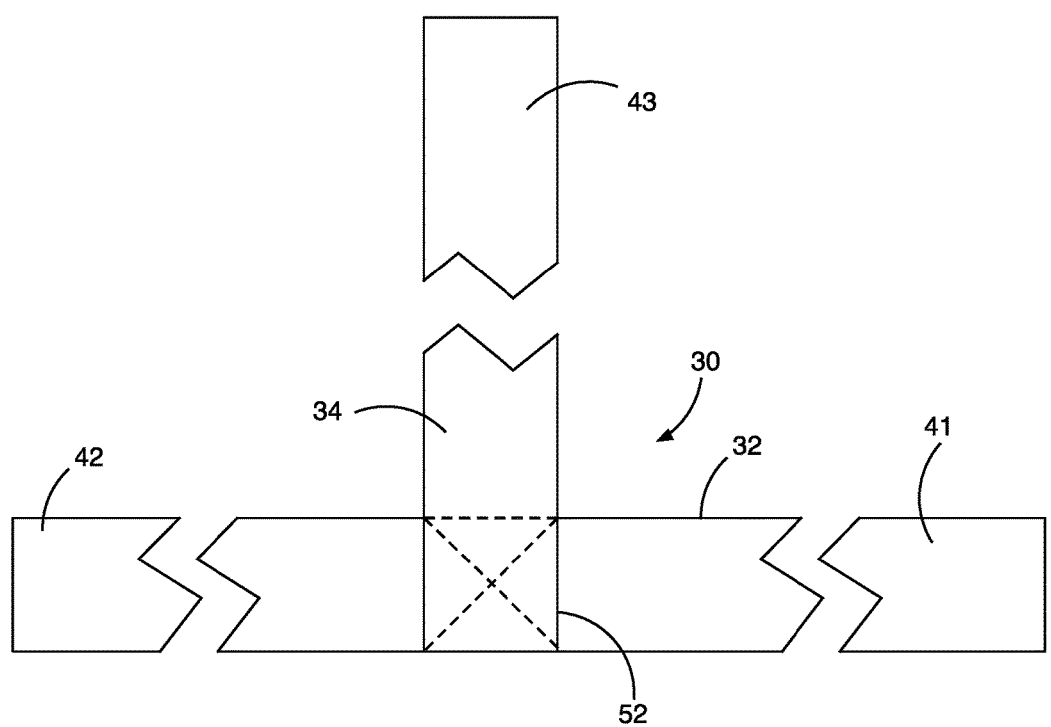
FIG. 4 is a top side view of a strap assembly in accordance with the principles of the present invention.

As show in FIGS. 1 and 2, the cargo restraining apparatus 10 is comprised of a T-shaped buckle assembly 16 (see also FIG. 3) and a T-shaped strap assembly 30 (see also FIG. 4). The T-shaped buckle assembly 16 is formed from a first strap section 18 and a second strap section 20 attached to the first strap section 18 to form a "T". Each strap end 22, 24 and 26 includes a buckle 23, 25 and 27, respectively, that is permanently and fixedly attached to the respective strap end. The T-shaped strap assembly 30 (see also FIG. 4) includes a first strap 32 configured to extend around a cargo 40 and a second strap 34 configured to extend over the cargo 40. The fixed end 38 of the strap 34 is permanently and fixedly attached to the strap 32 in an overlapping manner. The free ends 41, 42 and 43 of the first and second straps 32 and 34 of the strap assembly 30 are releasably attached to the buckles 23, 25 and 27 of the T-shaped buckle assembly 16.

In order to secure the cargo 40 to the trailer 12, the strap 32 (as shown in FIGS. 1 and 2) is wrapped around the cargo 40 at an appropriate height, which may be at, above or below the center of gravity of the cargo 40, and attached to the buckle assembly 16. The strap 34 is placed over the cargo 40 approximately at its midpoint and attached to the buckle assembly 16. Each strap end 41, 42 and 43 is cinched relative to the buckle assembly 16 so that the straps 32 and 34 are snugly tightened around and over the cargo 40, respectively.

The foregoing assembly procedure secures the now coupled strap and buckle assemblies 30 and 16 tightly over and around the cargo 40 thus preparing to secure the unitized cargo 40 and strap assemblies 30 and 16 to the trailer 12.

Cargo strap clips 50, 52, 54 and 56 are slid over the strap 32 at appropriate locations proximate to the corners of the cargo 40 to be anchored. Once the cargo strap clips 50, 52, 54 and 56 are in desired positions, tie-down straps 14a-14d are each then attached at one end to a respective cargo strap clip 50, 52, 54 and 56 and the other end to a respective anchor 15a-15d of the trailer 12. Each tie-down strap 14a-14d is then cinched to pull on the cargo strap clips 50, 52, 54 and 56, which are slid over strap 32. As a result, the strap assembly 30 tensions the strap 34 extending over the cargo 40. This arrangement of straps, buckles and clips secures the load to the trailer 12 in a manner that prevents tipping of the cargo 40 relative to the trailer 12 in all directions. The tie-down straps 14a-14d may comprise any cinch-type tie-down or cargo strap known in the art, including but not limited to ratchet straps, cam lock straps, buckle straps, bungee cords, rubber straps, and the like. Ratchet-type cargo straps are particularly useful because they can be tightly tensioned, are lockable at high tension and, because they often employ polyester or nylon webbing for the strap, do not stretch to any significant amount when a load is applied.

Referring now to FIG. 3, as previously described, the buckle assembly 16 is comprised of a first strap 18 attached to a second strap 20. In the case where the straps 18 and 20 are formed from polyester, nylon or other suitable webbing, the straps 18 and 20 may be sewn together as illustrated or otherwise fixedly joined by fasteners (such as rivets), by bonding (as with an adhesive), by welding or other devices or methods known in the art. It is also contemplated that the straps 18 and 20 may be integrally formed from a variety of suitable materials known in the art, such as metal or plastic provided that they are configured to provide sufficient tensile strength under load. In addition, the strap 20 may wrap around the strap 18 to provide another layer of attachment to strap 18. In any event, the straps 18 and 20 are permanently and fixedly attached in the form of a T-shape. Thus, while reference is made herein to straps 18 and 20 being joined together, is its contemplated that the straps 18 and 20 may be formed from a single piece of material formed in a T-shape or formed from three or more pieces of material joined together into a T-shape. It should also be noted that reference to the term T-shape is intended to cover structures and devices that are generally T-shaped, such as a triangularly shaped structure with buckles attached at each corner of the triangle. Thus, the arrangement of the straps 18 and 20 are to position the buckles 23 and 25 along the same horizontal axis with the buckles 23 and 25 facing in opposite directions and the buckle 27 oriented at approximately 90 degrees to the buckles 23 and 25 to thus face in a direction perpendicular to the horizontal axis. It is noted that the term "buckle" as used herein and in the claims, is intended to cover and include ratchet-type buckles, cam-lock type buckles, spring-type buckles, cinch-type buckles, center release buckles, side release buckles, strap adjuster buckles, clasp-type buckles or any other buckles known in the art or combinations thereof.

The ends 22, 24 and 26 of straps 18 and 20 are secured to buckles 23, 25 and 27, respectively. In the case where straps 18 and 20 are formed from polyester or nylon webbing, each of the ends 22, 24 and 26 is looped around a transversely extending portion of the buckle and sewn back upon itself to permanently and fixedly couple the straps 18 and 20 to the buckles 23, 25, and 27. The corresponding straps, such as strap 34 shown in dashed lines, are threaded through the buckles, such as buckle 27 with the free end 43 of the strap 34 pulled to tightly cinch the strap 34 over the cargo 40. The free ends of the strap 32 (not shown) are similarly threaded through buckles 23 and 25, with the free ends of the strap 32 being pulled tightly to cinch the strap 32 around the cargo 40. It is further contemplated that such buckles may be of any buckle configuration known in the art of tie-down straps, including without limitation other buckle configurations, ratchet-type strap cinching devices, cam-type devices and the like.

As shown in FIG. 4, the strap assembly 30 is comprised of strap sections 32 and 34, with one end 52 of strap 34 attached at approximately a midpoint of strap 32. The straps 32 and 34 may be secured to one another by being sewn together as illustrated or by other means, such as rivets, adhesive attachment, welding or other methods known in the art. The straps 32 and 34 are sufficiently long so that strap 32 is able to wrap completely around a cargo and be secured to the buckle assembly 16 (see FIG. 1) and strap 34 is able to extend from the strap 32 over the cargo and be secured to the buckle assembly 16 with sufficient extra length to be able to be cinched relative to the buckle assembly 16.

Figures 5A, 5B:
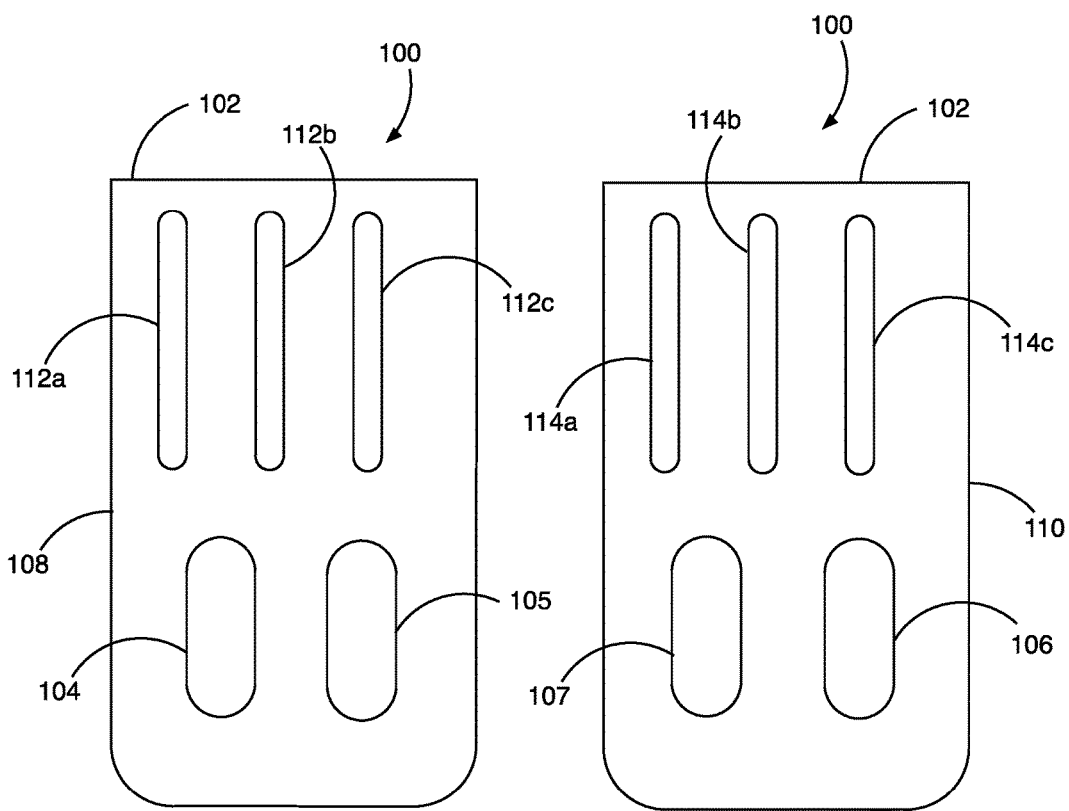
FIGS. 5A and 5B are front and back side views, respectively, of a cargo strap clip in accordance with the principles of the present invention.

FIGS. 5A and 5B illustrate front and back sides, respectively, of a first embodiment of a cargo strap clip 100 in accordance with the principles of the present invention. The cargo strap clip 100 is comprised of an elongate plate that is folded over along top edge 102. Two apertures 104 and 105 or 106 and 107 are provided in each half of the cargo strap clip 100, respectively, that are visually aligned when the two halves of the cargo strap clip 100 are brought together. The apertures 105 and 107 are positioned to assist the user in bringing the two sides together by providing thumb and finger grasp points proximate the apertures on each half with apertures 105 and 107 configured to receive a hook of a tie-down strap 14a-14d as will be further shown and described herein. Each half 108 and 110 of the cargo strap clip 100 is provided with a plurality of recesses 112a-112c and 114a-114c that form corresponding protrusions on the inside surface of each half 108 and 110, respectively. The recesses 112a-112c are offset from the recesses 114a-114c so that the corresponding protrusions intermesh when the two halves 108 and 110 are brought together to tightly grip the strap that extends through the clip 100 (see FIG. 1).

As shown in FIGS. 6 and 7, the two halves 108 and 110 or legs 120 and 122 are joined together about a bend 116 in the top 102 of the clip 100. Each side portion 108 and 110 is outwardly splayed in an arcuate manner from the bend 116 to their distal ends 108' and 110'. In this position, the protrusions 112c' and 114a' are separated to allow the cargo strap clips 50, 52, 54 and 56 to be slid over a portion of the strap 32. Thus, the strap 32 is between the protrusions of a respective cargo strap clip 50, 52, 54 and 56. The distal ends 108' and 110' can then be brought together so that the apertures 104 and 106 (see FIGS. 5A and 5B) are brought into alignment and a hook 121 of a tie-down strap assembly 123 can be inserted through the apertures 104 and 106. This holds the ends 108' and 110' together, which in turn causes the protrusions, such as protrusions 112c' and 114a', into interlocking manner to hold and retain a strap positioned therein so that the cargo strap clip 100 will not slide along the strap in a direction transverse to the long axis of the tie-down strap 123.

Figure 8:
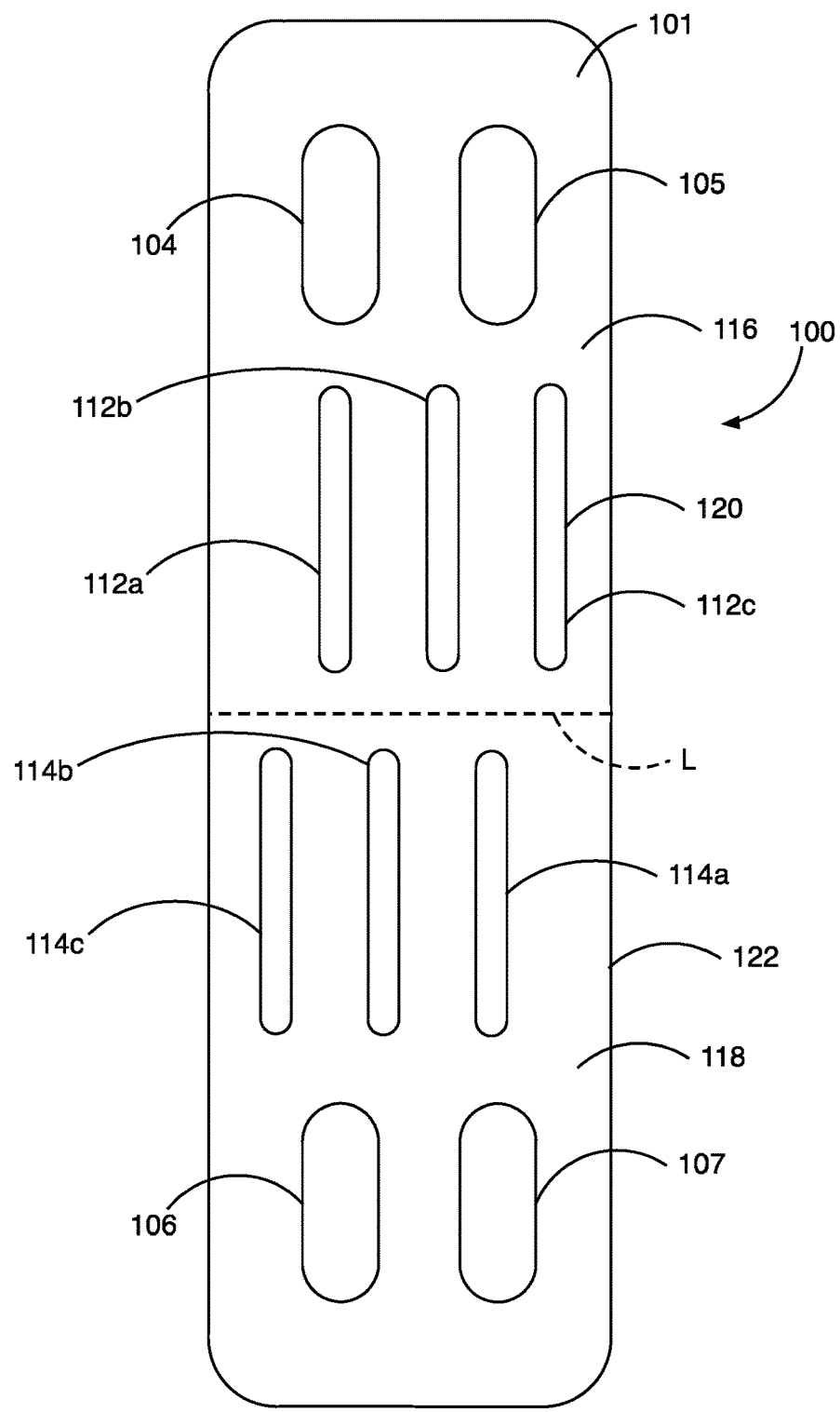
FIG. 8 is a front side view of the cargo strap clip of FIG. 5A before bending.

To form the cargo strap clip 100, as shown in FIG. 8, an elongated plate 101 of material, such as plastic, spring steel or other materials known in the art may be stamped or molded into the generally rectangular shape as shown. The apertures 104 and 106 and apertures 105 and 107 may be formed by stamping or molding. The apertures 104 and 106 and apertures 105 and 107 are offset from longitudinal centerline of the clip 100 to provide grasping points adjacent the hook receiving apertures 104 and 106, which receive a hook 121 of the tie down strap assembly 123. Functions of the apertures 104 and 106 and apertures 105 and 107 are interchangeable. Protrusions 112a'-112c' and 114a'-114c' are formed on the interior surfaces 116 and 118, respectively, as by stamping or molding. The plate 101 is then folded along the centerline L of the plate 101. The two resulting legs 120 and 122 of the clip 100 may be formed in a splayed out manner as shown in FIG. 6.

Figure 9:
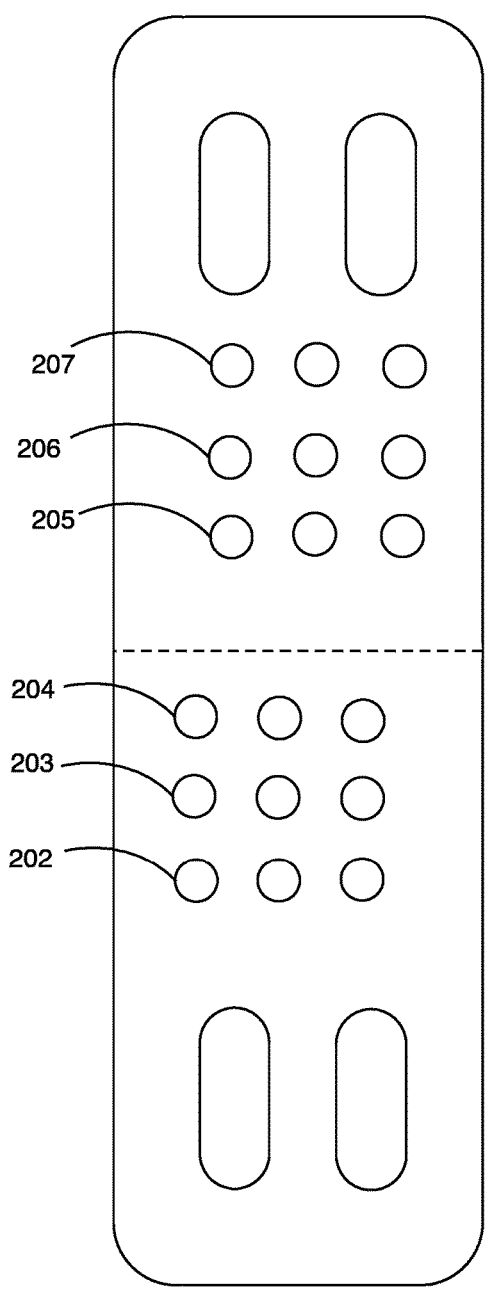
FIG. 9 is a front side view of another embodiment of a cargo strap clip in accordance with the principles of the present invention.
Figure 10:
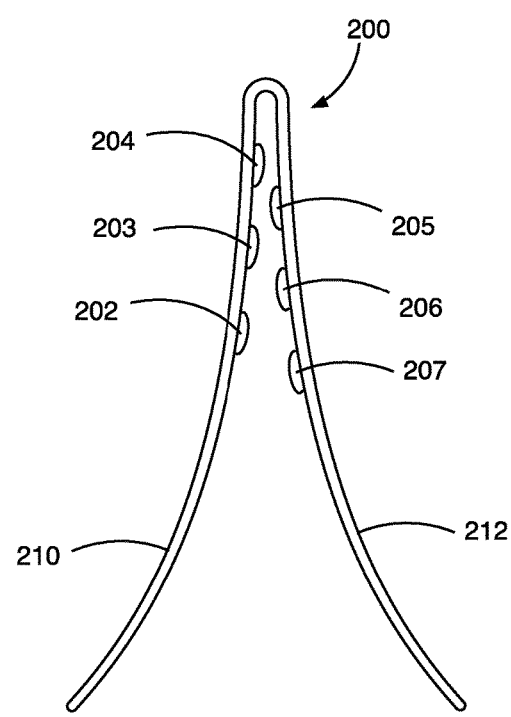
FIG. 10 is a side view of the cargo strap clip of FIG. 9 after bending.

FIGS. 9 and 10 illustrate an alternative embodiment of a cargo strap clip, generally indicated at 200, in accordance with the principles of the present invention. The clip 200 is configured similarly to the clip 100 shown in FIGS. 6 and 8, but the inner protrusions, such as protrusions 202-207, are in the form of round protrusions that are offset from one another so as to grasp a strap that is inserted therein between when the two legs 210 and 212 of the clip 200 are brought together as similarly shown in FIG. 7. Once coupled to and tensioned by a tie-down hook as shown in FIG. 7, the clip protrusions 202-207 prevent the clip 200 from sliding relative to the strap to which the clip 200 is attached. This allows the tie-down strap attached to the clip 200 to be properly tensioned without risk of the clip 200 moving relative to the strap to which it is attached that could otherwise cause the tie-down strap to loose tension and thereby allow the cargo load to which the cargo restraining apparatus 10 of the present invention is secured to shift or move relative to the structure to which it is secured.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

While the present invention has been described with reference to certain illustrative embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

Thus, aspects and applications of the invention presented here are described in the drawings and in the foregoing detailed description of the invention. Those of ordinary skill in the art will realize that the description of the present invention is illustrative only and not in any way limiting. Other embodiments of the invention will readily suggest themselves to such skilled persons including, without limitation, combinations of elements of the various embodiments. Various representative implementations of the present invention may be applied to any tie down cargo restraining system.

Unless specifically noted, it is intended that the words and phrases in the specification and the claims be given their plain, ordinary, and accustomed meaning to those of ordinary skill in the applicable arts. It is noted that the inventor can be his own lexicographer. The inventor expressly elects, as his own lexicographer, to use the plain and ordinary meaning of terms in the specification and claims unless they clearly state otherwise in which case, the inventor will set forth the "special" definition of that term and explain how it differs from the plain and ordinary meaning. Absent such statements of the application of a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description of the Invention or claims is not intended to somehow indicate a desire to invoke the special provisions of 35 U.S.C. § 112(f) to define the invention. To the contrary, if the provisions of 35 U.S.C. § 112(f) are sought to be invoked to define the inventions, the claims will specifically and expressly state the exact phrases "means for" or "step for" and the specific function (e.g., "means for heating"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

What is claimed is:

1. A cargo restraining apparatus, comprising:
   a T-shaped buckle assembly, the T-shaped buckle assembly comprising a first T-shaped strap assembly having first, second and third free ends and first, second and third strap buckles, each of the first, second and third strap buckles fixedly coupled to a respective one of the first, second and third free ends of the first T-shaped strap assembly;

a second T-shaped strap assembly comprising first and second elongate straps, the second elongate strap having a first end coupled to the first elongate strap forming a T between the first and second elongate straps, the second end of the second elongate strap and first and second free ends of the first elongate strap each configured for coupling to a respective one of the first, second or third strap buckles of the T-shaped buckle assembly, the first elongate strap having a first length to extend substantially horizontally around a cargo and the second elongate strap configured to extend substantially vertically over a top of the cargo;

a plurality of tie-down clips configured to be selectively positionable along the first elongate strap, each of the plurality of tie-down clips comprising:

a plate, the plate defining a folded portion proximate a midsection of the plate, a first end of the plate opposite the midsection defining a first retaining hole that aligns with a second retaining hole defined in the second end of the plate opposite the first end when the first and second ends of the plate are brought together, the folded portion extending substantially parallel to and positioned against an upper edge of the first elongate strap with the first and second ends of the plate extending downward from the upper edge; and a plurality of tie-down straps, each having a first end hook coupled to a respective one of the plurality of tie-down clips with the first end hook passing through the first and second retaining holes of the plate and a second end hook coupled to a structure upon which the cargo is resting, the first end hook forcing the first and second ends of the respective one of the plurality of tie-down clips together to cause the plate to grasp the first elongate strap and prevent sliding of the respective one of the plurality of tie-down clips relative to the first elongate strap.

2. The cargo restraining apparatus of claim 1, wherein the T-shaped buckle assembly is comprised of first and second strap sections fixedly attached together with the second strap section attached proximate a midpoint of the first strap section.

3. The cargo restraining apparatus of claim 1, wherein the first and second strap sections position the first and second strap buckles along a horizontal axis with the first and second strap buckles facing in opposite directions and the third strap buckle oriented at approximately 90 degrees to the first and second buckles to face in a direction perpendicular to the horizontal axis.

4. The cargo restraining apparatus of claim 1, wherein the first and second elongate straps are fixedly attached together with the second elongate strap fixedly attached proximate a midpoint of the first elongate strap.

5. The cargo restraining apparatus of claim 1, wherein the first and second elongate straps are oriented relative to one another so that the first and second free ends of the first elongate strap are extendable along a horizontal axis when laid flat with the first and second free ends facing in opposite directions and the second elongate strap is oriented at approximately 90 degrees to the first elongate strap so that second end of the second elongate strap faces in a direction perpendicular to the horizontal axis when laid flat.

6. The cargo restraining apparatus of claim 1, wherein each of the plurality of tie-down clips comprise a plurality of protrusions on an inside surface for engaging with the first elongate strap.

7. The cargo restraining apparatus of claim 6, wherein the plurality of protrusions comprises a first set of protrusions positioned on one side of the folded portion and a second set of protrusions positioned on an opposite side of the folded portion, the first and second set of protrusions positioned to engage with one another when the first and second ends of the plate are brought together.

8. The cargo restraining apparatus of claim 7, wherein each of the plurality of tie-down clips are comprised of a resilient material and the first and second ends of the plate are flared apart when in a resting position to allow the first elongate strap to be positioned within the plurality of tie-down clips and wherein the plurality of tie-down clips become non-slidably attached to the first elongate strap when the first and second ends of the plate are brought together.

9. A cargo restraining apparatus, comprising:

a buckle assembly, the buckle assembly comprising a first strap assembly having first, second and third free ends and first, second and third strap buckles, each of the first, second and third strap buckles fixedly coupled to a respective one of the first, second and third free ends of the first strap assembly; and a second strap assembly comprising first and second elongate straps, the second elongate strap having a first end coupled to the first elongate strap, the second end of the second elongate strap and first and second free ends of the first elongate strap each configured for coupling to a respective one of the first, second or third strap buckles of the buckle assembly, the first elongate strap having a first length to extend substantially horizontally around a cargo and the second strap configured to extend substantially vertically over a top of the cargo; and a plurality of tie-down clips configured to be selectively positionable along the first elongate strap, each of the plurality of tie-down clips comprising:

a plate, the plate folded along a midsection of the plate with a first portion of the plate extending on a first side of the midsection and a second portion of the plate extending on a second side of the midsection, the first portion of the plate defining a first retaining hole that aligns with a second retaining hole defined in the second portion of the plate opposite the first portion when the first and second ends of the plate are brought together, the midsection extending substantially parallel to and positioned against an upper edge of the first elongate strap with the first and second ends of the plate extending downward and on opposite sides of the first elongate strap, each of the first and second portions of the plate held together with a respective tie-down strap engaging the first and second retaining holes to prevent sliding of the respective tie-down clip relative to the first elongate strap.

10. The cargo restraining apparatus of claim 9, further comprising a plurality of tie-down straps, each having a first end hook coupled to the first and second retaining holes of one of the plurality of tie-down clips and a second end coupled to a structure upon which the cargo is supported.

11. The cargo restraining apparatus of claim 9, wherein the first strap assembly comprises a first T-shaped arrangement of straps to which the first, second and third buckles are coupled.

12. The cargo restraining apparatus of claim 11, wherein the second strap assembly comprises a second T-shaped arrangement of straps.

13. The cargo restraining apparatus of claim 11, wherein the first strap assembly is comprised of first and second strap sections fixedly attached together with the second strap section attached proximate a midpoint of the first strap section.

14. The cargo restraining apparatus of claim 9, wherein the first and second strap sections position the first and second strap buckles along a horizontal axis with the first and second strap buckles facing in opposite directions and the third strap buckle oriented at approximately 90 degrees to the first and second buckles to face in a direction perpendicular to the horizontal axis.

15. The cargo restraining apparatus of claim 9, wherein the first and second elongate straps are fixedly attached together with the second elongate strap fixedly attached proximate a midpoint of the first elongate strap.

16. The cargo restraining apparatus of claim 9, wherein the first and second elongate straps are oriented relative to one another so that the first and second free ends of the first elongate strap are extendable along a horizontal axis when laid flat with the first and second free ends facing in opposite directions and the second elongate strap is oriented at approximately 90 degrees to the first elongate strap so that second end of the second elongate strap faces in a direction perpendicular to the horizontal axis when laid flat.

17. The cargo restraining apparatus of claim 9, wherein each of the plurality of tie-down clips comprise a plurality of protrusions on an inside surface for engaging with the first elongate strap, the plurality of protrusions comprising a first set of protrusions positioned on one side of the folded portion and a second set of protrusions positioned on an opposite side of the folded portion, the first and second set of protrusions positioned to engage with one another when the first and second ends of the plate are brought together.

* * * * *